(12) United States Patent
Gupta

(10) Patent No.: US 12,548,028 B2
(45) Date of Patent: Feb. 10, 2026

(54) LIGHT MESH OVER WATCH ENABLED CUSTOMER AUTHENTICATION AND FRAUD PREVENTION TECHNOLOGY

(71) Applicant: Bank of America Corporation, Charlotte, NC (US)

(72) Inventor: Saurabh Gupta, New Delhi (IN)

(73) Assignee: Bank of America Corporation, Charlotte, NC (US)

(*) Notice: Subject to any disclaimer, the term of this patent is extended or adjusted under 35 U.S.C. 154(b) by 100 days.

(21) Appl. No.: 18/197,141

(22) Filed: May 15, 2023

(65) Prior Publication Data
US 2024/0386428 A1 Nov. 21, 2024

(51) Int. Cl.
*G06Q 20/40* (2012.01)
*G06Q 20/10* (2012.01)
*G06Q 20/32* (2012.01)

(52) U.S. Cl.
CPC ..... *G06Q 20/4016* (2013.01); *G06Q 20/1085* (2013.01); *G06Q 20/321* (2020.05); *G06Q 20/40155* (2020.05)

(58) Field of Classification Search
CPC .............. G06Q 20/10455; G06Q 20/1085
USPC ...................................... 705/35–45
See application file for complete search history.

(56) References Cited

U.S. PATENT DOCUMENTS

| 11,392,934 | B1 | 7/2022 | Gupta |
| 11,704,666 | B1* | 7/2023 | Barakat .............. G06Q 20/4015 705/44 |
| 2019/0370805 | A1 | 12/2019 | Van Os et al. |
| 2020/0387887 | A1 | 12/2020 | Rathod |
| 2021/0027295 | A1* | 1/2021 | Raquepaw ............ G07F 19/206 |

(Continued)

OTHER PUBLICATIONS

David Nield, "All The Ways You Can Pay With A Phone Or Smartwatch," https://www.wired.com/story/how-to-pay-with-phone-smartwatch/, Oct. 13, 2020.

*Primary Examiner* — Robert R Niquette
(74) *Attorney, Agent, or Firm* — Weiss & Arons LLP

(57) ABSTRACT

An interactive light mesh over a smartwatch that operates as a customer authenticator and fraud detector, and its method of use, are provided. The interactive light mesh may comprise muti-colored nodes representing smartwatches and automatic teller machines ("ATMs") located within a threshold distance from the interactive light mesh. The interactive light mesh may display data elements from smartwatches and ATMs. The interactive light mesh may display communications with financial institutions associated with each smartwatch and ATM. Each financial institution may transmit an approval request to a device associated with each smartwatch or ATM. Each device may receive a request to approve each transaction. Each device may approve the request, and the approval may be transmitted to each financial institution. Each financial institution may transmit an approval notification to the smartwatch. Upon receipt of an approval notification for each smartwatch or ATM, the smartwatch may transmit the captured data elements and the transaction amount for each smartwatch or ATM and payee data to a processor for transaction processing. The interactive light mesh may display transaction approvals, denials, and questionable transactions.

7 Claims, 6 Drawing Sheets

(56) References Cited

U.S. PATENT DOCUMENTS

2021/0065471 A1* 3/2021 Giraudo .............. G06Q 20/047
2024/0386428 A1* 11/2024 Gupta ................. G06Q 20/321

* cited by examiner

LIGHT MESH OVER WATCH ENABLED CUSTOMER AUTHENTICATION AND FRAUD PREVENTION TECHNOLOGY

FIELD OF TECHNOLOGY

Aspects of the disclosure relate to smartwatches. Specifically, this disclosure relates to smartwatch communications and authentications.

BACKGROUND OF THE DISCLOSURE

Smartwatches have become more common in recent years. For the purposes of the disclosure, smartwatches may be understood to mean wearable watches that include one or more internal processors.

Smartwatches are compact devices and usually stay with the user. Therefore, smartwatches are easily accessible. Because of the ease of access associated with smartwatches, it would be desirable for a smartwatch to communicate with one or more payment devices, such as a payment card. A payment card may be a debit card, a credit card, an automated teller machine ("ATM") card or any other suitable card. This patent application incorporates by reference in its entirety U.S. Pat. No. 11,392,934. U.S. Pat. No. 11,392,934 discloses smartwatch integration with multiple debit and credit cards enabling seamless and automatic payments.

While the technology from U.S. Pat. No. 11,392,934 is valuable, there are inherent risks in enabling payments between smartwatches and card holders without validating the authenticity, and the credit and fraud history of the card holders.

It would be desirable for the smartwatch to automatically identify the authenticity of all card holders located within a threshold distance to the smartwatch.

It would be yet further desirable for the smartwatch to act as a liaison between the payment card(s) and the financial institution for purposes of authentication.

It would be further desirable for such authentication to obviate the need for authentication by associated mobile devices, desktop computers, laptop computers, card devices or any other devices.

It would be desirable for the communications between the smartwatch and the financial institution to include payment instructions and/or payment data.

It would be yet further desirable for the smartwatch to operate as a card reader.

It would be yet further desirable for the communication between the smartwatch and the one or more payment cards to enable a first smartwatch to gather funds from multiple accounts associated with the payment cards, and to initiate a transfer of funds instruction.

It would be yet further desirable for the smartwatch and the one or more payment cards to interact within a threshold distance.

It would be yet further desirable for the authentication between the smartwatch and the one or more payment cards to be displayed on an interactive light mesh over the smartwatch.

It would be yet further desirable for the benefactor of the transfer of funds instruction to be the multiple accounts associated with the payment cards.

It would be still further desirable for the beneficiary of the transfer of funds instruction to be a third-party account.

SUMMARY OF THE DISCLOSURE

Apparatus and methods for authentication of smartwatch-based multi-card transactions using a light mesh are provided. For the purposes of this application, smartwatches are wearable devices that are typically worn on a wrist. Smartwatches may include one or more processors. Smartwatches may execute various applications.

Exemplary smartwatch components may include standard watch components such as a strap, a casing and a face.

Exemplary smartwatch components specific to a smartwatch may include a micro control unit ("MCU"), a central processing unit ("CPU"), a graphical processing unit ("GPU"), one or more faces including one or more screens, one or more sensors, a Bluetooth chipset, a haptic feedback unit, a global positioning system ("GPS") receiver, a loudspeaker, a microphone, a printed circuit board ("PCB"), a power management unit, read only memory ("ROM"), random access memory ("RAM"), a touch screen controller, a waterproof seal, a universal serial bus ("USB") controller, charging connectors, a radio receiver (Wi-Fi), a digital signal processor, a near-field communication ("NFC") component, a micro-electro-mechanical system ("MEMS") and a camera.

Exemplary MCUs may control sensors and processors included in the smartwatch.

Exemplary CPUs may execute the main processing on the smartwatch. Many smartwatch CPUs are licensed advanced reduced instruction set computing (RISC) machines ("arm")® processors.

Exemplary GPUs may be processors that are used to reduce the workload on the CPU when rendering and generating the graphics on the smartwatch. The GPU may be a specialized circuit designed to rapidly manipulate and alter memory to accelerate the creation of images.

Exemplary smartwatch faces range from 30-60 mm long by 30-60 mm wide. Exemplary smartwatch screens may include a depth of approximately 5 mm to 20 mm. Exemplary smartwatch screens may have capacitive touch screens. Exemplary smartwatch screens can be made of various materials, such as traditional liquid crystal display ("LCD"), sharp memory LCD, in-plane switching ("IPS") LCD with higher pixel density, electronic-ink ("E-ink"), organic light emitting diode ("OLED"), OLED with higher pixel density and interferometric modulator display technology (also referred to as Mirasol® display technology).

The display may be laminated onto polished sapphire crystal or other suitable substances. The sapphire crystal may be synthetic sapphire crystal. The display may be laminated onto ion x glass. It should be appreciated that ion x glass may be more flexible than sapphire crystal.

The smartwatch may transmit the aggregated transaction payload to a processing entity. The processing entity may transmit an approval request to each device identified within each set of card data elements. In some embodiments, the processing entity may transmit the approval request to each device via the financial institution identified within each set of card data elements. The approval request may include the transaction amount. The approval request may include identifying data relating to the smartwatch. Such identifying data may include a name associated with the smartwatch, an alias name associated with the smartwatch, geographical information relating to the smartwatch and any other suitable data.

The approval request may also include identifying information relating to the smartwatch that initiated the transaction. The approval request may also include identifying information relating to the transaction itself. Examples of identifying information may include a name, and/or alias name, associated with the smartwatch. Examples of identifying information may also include geolocation data associated with the smartwatch. Examples of identifying information may also include an internet protocol ("IP") address associated with the smartwatch.

The approval request may also include identification data relating to a payee of the transaction. For example, the approval request may include a payee name, payee alias name, payee account number, payee financial institution, payee telephone number, payee e-mail address and any other suitable payee information. The payee identification data may be received at a user interface of the smartwatch. Such a user interface may be a touch screen. The payee identification data may be retrieved from a location internal to the smartwatch. Such a location may be a memory location. The payee identification data may be received from a location external to the smartwatch. Such a location may be a merchant point-of-sale device.

In some embodiments, the smartwatch's user may be associated with the payee account. As such, the payee identification data may be an account associated with the smartwatch device. In such embodiments, the payee identification data may be retrieved from a storage location internal to the smartwatch device.

The processing entity may receive an approval from each device that received an approval request. Upon receipt of the approval from each device, the processing entity may process the aggregated transaction payload.

Upon processing the aggregated transaction payload, the processing entity may transmit a notification to each device that received an approval request. The processing entity may also transmit a notification to the smartwatch. The notification may include details relating to the processed transaction.

In some embodiments, the transaction amount may be received at the smartwatch prior to the smartwatch communicating with the external entities. As such, in addition to communicating the set of card data elements to the external entities, the smartwatch may also communicate a transaction amount to the external entities.

In such embodiments, the approval request transmitted from each external entity to the device identified within the card data elements may include the transaction amount. Therefore, the approval received at each device may include approving the transaction amount.

In response to receiving an approval from the device, each external entity may transmit the approval to the smartwatch. In some embodiments, the account number may be transmitted separately from the approval. In other embodiments, the account number may be transmitted together with the approval. In yet other embodiments, the account number may be transmitted without the approval. In still other embodiments, the approval may be transmitted without the account number.

In embodiments where the approval is transmitted without the account number, in order for the processing entity to process the transaction, the aggregated transaction payload may include at least a portion of the card data elements linked to the transaction amount.

In some embodiments, the smartwatch obtains financial institution information from another smartwatch or card leveraging a debit or credit card, which is already integrated on the smartwatch.

In some embodiments, after getting financial institution information for the other smartwatch user or ATM, the smartwatch will communicate with its own financial institution and identify account validity, account fraud history, account balance, and account status of the last 10 transactions.

In some embodiments, the smartwatch light mesh will process card authentication using a bulk synchronous processing algorithm. Bulk data sent and gathered by the smartwatch will be used to determine the authenticity of each card.

In some embodiments, the smartwatch light mesh will utilize a fraud detection controller. The fraud detection controller will analyze current and prior fraud detection. The fraud detection controller can communicate with smartwatch user's own financial institution to indicate whether the transaction can proceed.

In some embodiments, the smartwatch light mesh will utilize multi-nodal synchronous payments. Multi-nodal synchronous payments provide the ability to initiate payments to multiple nodes simultaneously.

In some embodiments, the smartwatch light mesh will integrate with another smartwatch device or ATM, by fetching details from the other smartwatch or ATM itself. This will help the smartwatch in determining other smartwatch and ATM proximity to the smartwatch user and would help in fraud identification.

In some embodiments, a mesh light creator is used to create a mesh of lights displayed over a smartwatch display.

In some embodiments, the active and dynamic light mesh over smartwatch indicates surrounding smartwatches and ATMS, within a threshold distance, and which can transact with the smartwatch.

In some embodiments, each node in the light mesh represents a smartwatch or ATM located within a threshold distance from the light mesh, and the color of each node represents the status of smartwatch pairing with another smartwatch or ATM.

In some embodiments, the threshold distance is about 6 feet. In some embodiments, the threshold distance is about 8 feet. In some embodiments, the threshold distance is about 10 feet. In some embodiments, the threshold distance is about 20 feet.

In some embodiments, a light mesh node may indicate an invalid transaction. For example, a red node would indicate that fraud has been detected and pairing would not occur for payment.

In some embodiments, a light mesh node may indicate a valid transaction. For example, a green node would indicate a successful pairing and that fraud status has cleared.

In some embodiments, a light mesh node may indicate a pending transaction. For example, a grey node would indicate a delayed pairing pending fraud status approval.

In some embodiments, a light mesh over smartwatch will enable the smartwatch user to click, tap, or touch one or more light mesh nodes authenticating and enabling multiple transactions simultaneously.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
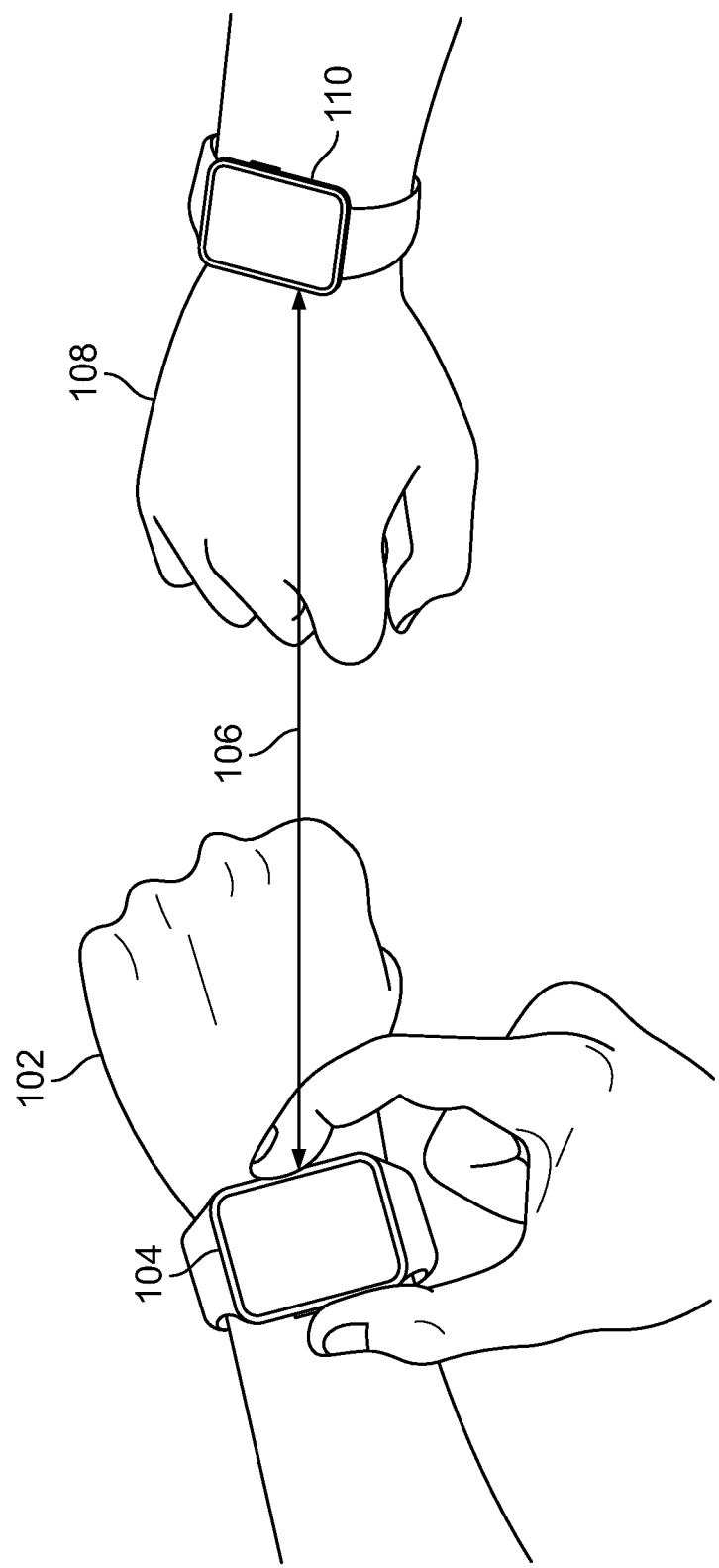
FIG. 1 shows an illustrative diagram in accordance with principles of the disclosure.

Apparatus and methods for smartwatch light mesh devices that authenticate and display multi-card transactions are provided.

A smartwatch may include a plurality of hardware components and software components, such as those described in detail in the summary of the disclosure. The hardware components may include a watch face and a band. The watch face may rest on a user's wrist. The band may wrap around the user's wrist and secure the watch face relative to the user's wrist.

The hardware components may also include one or more microprocessors. At least one of the microprocessors may be operable to initiate a transaction.

The hardware components may also include one or more displays. The microprocessor may instruct the display regarding the software displays. At least one of the displays may display software displays. At least one of the displays may be a nano light emitting diode ("LED") touch screen.

The nano touch screen may be a nano organic light emitting diode ("OLED") touch screen. The nano OLED touch screen may be constructed using OLED technology.

OLED technology may enhance functionality of a smartglasses display. OLEDs are typically solid-state semiconductors constructed from a thin film of organic material. OLEDs emit light when electricity is applied across the thin film of organic material. Because OLEDs are constructed using organic materials, OLEDs may be safely disposed without excessive harm to the environment.

Furthermore, OLEDs may be used to construct a display that consumes less power compared to other display technologies. For example, in a liquid crystal display, power must be supplied to the entire backlight, even to illuminate one pixel in the display. In contrast, an OLED display does not necessarily include a backlight. Furthermore, in an OLED display, preferably, only the illuminated pixel draws power.

The power efficiency of OLED technology presents a possibility for designing nodes that consume less power for their basic functionality and allow any residual power to provide enhanced security and functionality. Illustrative devices that may be constructed using OLED technology are disclosed in commonly assigned U.S. Pat. No. 9,665,818, which is hereby incorporated by reference herein in its entirety.

The nano LED touch screen may receive user input. The user input may be touch-based user input, such as touch gestures. Touch gestures may include swiping, tapping, squeezing and any other suitable touch gestures. Touch gestures may also include a pattern of any of the above-mentioned gestures.

The hardware components may also include a scanner. The scanner may include a camera. The scanner may include a magnetic scanning device. The scanner may include any other suitable data-capturing hardware or software. The scanner may capture a plurality of card photographs. The plurality of card photographs may relate to a plurality of payment cards.

The hardware components may also include a nano wireless network interface card ("NIC"). The nano wireless NIC may establish communication with a wireless network.

The hardware components may also include a battery. The battery may power the display, such as the nano LED touch screen, the microprocessor, the scanner and the nano wireless NIC.

The smartwatch may also include a plurality of software components.

The plurality of software components may include a card data identification module. The card data identification module may identify a set of card data elements from each captured card photograph. Each set of card data elements may relate to a card included the plurality of cards.

The plurality of software components may include an information controller module. The information controller module may capture a transaction amount for each of the plurality of payment cards. The information controller module may communicate with the nano LED touch screen to capture the transaction amounts. In some embodiments, a touch screen module may interface between the nano LED touch screen and the information controller module.

The plurality of software components may also include a card data aggregation and validation module. The card data aggregation and validation module may link the captured transaction amount to the set of card data elements for each card.

The card data aggregation and validation module may also transmit the set of card data elements to an external card entity associated with the card. The external card entity may be identified within each set of card data elements.

The card data aggregation and validation module may also receive an approval signal from each external card entity. The approval signal may be an indication of approval of the transaction. Upon receipt of the approval signal from each external card entity, the card aggregation and validation module may aggregate each set of card data elements linked to the transaction amount into an aggregated transaction payload.

In some embodiments, prior to receiving the approval signal, the external card entity may request and receive approval from a device identified within the card data elements. The device may be a second smartwatch, a mobile device, a smartglasses or any other suitable device.

The plurality of software components may also include a payee data identification module. The payee data identification module may identify a plurality of payee data elements. The payee data identification module may be instantiated prior to, or upon conclusion of, the card data aggregation and validation module.

The plurality of software components may also include a wireless controller module. The wireless controller module may interface between the nano wireless network interface card and an external Wi-Fi device. The wireless controller module may provide wireless connectivity to the smartwatch device.

The plurality of software components may include a payment interface. The payment interface may receive wireless connectivity via the wireless controller module. The payment interface may receive processing capabilities from the microprocessor. The payment interface may receive the aggregated transaction payload. The payment interface may receive the payee data elements. The payment interface may append the payee data elements to the aggregated transaction payload. The payment interface may transmit the aggregated transaction payload to an external entity. The payment interface may receive a confirmation from the external entity.

In some embodiments, the payment interface may receive one or more payee data elements. In such embodiments, the payment interface may transmit the received aggregated transaction payload and the one or more payee data elements to the external entity. The external entity may be a processing entity.

Provided herein are methods of authentication of smartwatch-based transactions using interactive light mesh displays.

In some embodiments, a smartwatch scans other smartwatches and ATMs located within a threshold distance of the authenticating smartwatch, and then authenticates transactions with those other smartwatches and ATMs in the vicinity.

In some embodiments, the authenticating smartwatch integrates with the other smartwatches and ATMs within the vicinity, and prior to authentication.

In some embodiments, after smartwatch integration, an interactive light mesh with multi-colored nodes forms over the authenticating smartwatch.

In some embodiments, the authenticating smartwatch utilizes an interactive light mesh where at least one node color represents valid transactions, at least one node color represents invalid transactions, and at least one node color represents transactions pending approval.

In some embodiments, the authenticating smartwatch communicates with an entity computer. Smartwatch integration and other data elements received during smartwatch integration are shared between entities.

In some embodiments, the authenticating smartwatch receives from the entity computer data elements received from the integrated smartwatches and ATMs.

In some embodiments, the authenticating smartwatch processes the data elements from the integrated smartwatches and ATMs in bulk synchronous fashion.

In some embodiments, the authenticating smartwatch links the processed data elements from the integrated smartwatches and ATMs to the entity computer.

In some embodiments, the authenticating smartwatch transmits the processed data elements from the integrated smartwatches and ATMs to a processor. The processor forms a part of a processing entity computer.

In some embodiments, for each account number processed, the processing entity computer transmits an approval request to the integrated smartwatches and ATMs. The approval request contains the data elements from the integrated smartwatches and ATMs.

In some embodiments, for each transaction processed, the processing entity computer receives an approval from each device to which an approval request was transmitted.

In some embodiments, the processing entity computer simultaneously processes one or more approval requests for smartwatch or ATM transaction authentication.

In some embodiments, the processing entity computer transmits an approval request notification to the authenticating smartwatch and each device that had an approval request.

In some embodiments, the authenticating smartwatch uses data elements provided by the integrated smartwatches and ATMs, including, but not limited to, account validity, account fraud history, account balance, and the last 10 transactions of each account.

In some embodiments, the authenticating smartwatch scans its surroundings at threshold distances including, but not limited to, about 6 feet, 8 feet, 10 feet, 20 feet, and 100 feet.

In some embodiments, the authenticating smartwatch displays an interactive light mesh from a multi-layered screen. A multi-layered screen is made of at least two or more layers of screens, including, but not limited to, an input screen, an output screen, a touch panel, and a display screen. The screens may be layered in any order.

In some embodiments, the authenticating smartwatch utilizes a touch screen. A touch screen is made of a touch panel layered on top of an electronic visual display of the smartwatch. The electronic visual display of the smartwatch may include a multi-layered screen.

In some embodiments, the interactive light mesh over the authenticating smartwatch displays a three-dimensional hologram. A hologram is a three-dimensional moving picture intended to create the illusion that the object of the depiction is present in the same place as the viewer. The hologram may be created using light, electricity, and/or a multi-layered screen.

In some embodiments, the interactive light mesh over the authenticating smartwatch displays transaction approval requests, transaction approvals, and transaction denials.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative diagram. The illustrative diagram shows smartwatch-to-smartwatch communication. Smartwatch 104 may be worn by user 102. Smartwatch 110 may be worn by user 108. Smartwatches 104 and 110 may include capabilities such as those described above. Smartwatch 104 and smartwatch 110 may communicate with each other, as shown at communication 106. The communication may be an NFC-based communication. The communication may be a Wi-Fi-based communication. The communication may utilize any other suitable technology.

Figure 2:
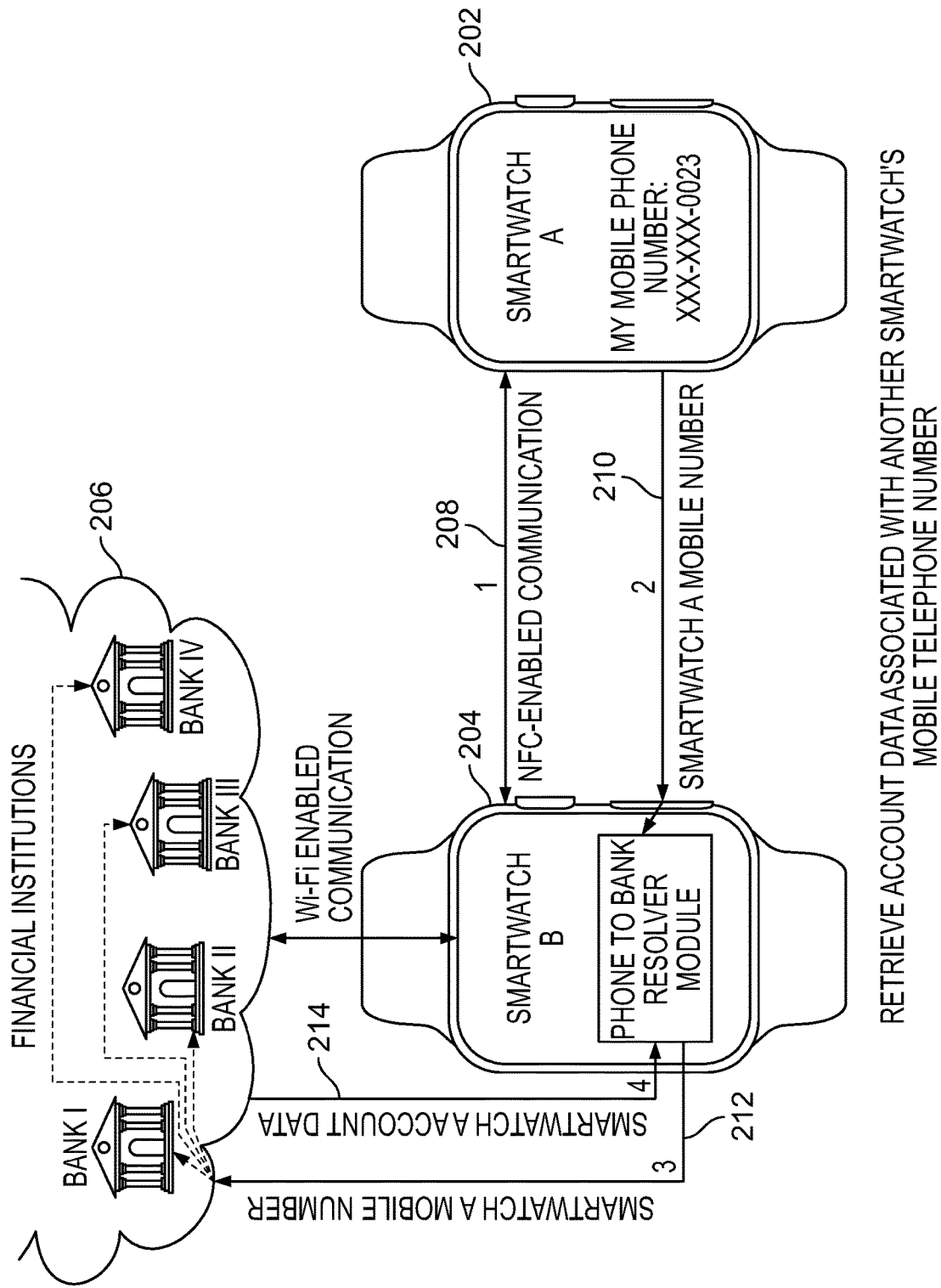
FIG. 2 shows an illustrative flow diagram in accordance with principles of the disclosure.

FIG. 2 shows an illustrative diagram. The illustrative diagram shows communication between a first smartwatch (smartwatch A), shown at 202, a second smartwatch (smartwatch B), shown at 204 and a plurality of financial institutions, shown at 206. The communications included in FIG. 2 show retrieving account data associated with another smartwatch's mobile telephone number.

It should be appreciated that the communications between smartwatch A and smartwatch B may be NFC-enabled or Bluetooth®-enabled communications. It should be further appreciated that the communications between smartwatch B and financial institutions 206 may be Wi-Fi®-enabled communications.

Smartwatch A may be associated with mobile telephone number XXX-XXX-0023. Smartwatch B may be associated with mobile telephone number XXX-XXX-6789 (not shown).

Step 1 of an exemplary communication is shown at 208. Step 1 may include initiation of a communication. The communication may be an NFC-enabled communication. The communication may be a payment communication. The payment communication may be transmitted from smartwatch A to smartwatch B and/or from smartwatch B to smartwatch A. In some embodiments, the initial communication between smartwatch A and smartwatch B may be a handshake communication.

The communication may include a transfer of funds instruction. The intent of the transfer of funds instruction may be to transfer funds from an account associated with smartwatch A to an account associated with smartwatch B. Each account may be linked to its respective smartwatch via the associated mobile telephone number. The payment communication that is transferred from smartwatch A to smartwatch B may include the mobile telephone number associated with smartwatch A.

Step 2 of the exemplary communication is shown at 210. In response to receiving the payment communication, smartwatch A may transmit its associated mobile telephone number to smartwatch B. The smartwatch A mobile telephone number may be received at the phone to bank resolver module within smartwatch B.

Step 3 of the exemplary communication is shown at 212. The phone to bank resolver module may communicate with each financial institution included in plurality of financial institutions 206. The communication may include attempting to identify account data associated with the smartwatch A mobile phone number. The phone to bank resolver may transmit the smartwatch A mobile phone number to each financial institution included in plurality of financial institutions 206. The response from each financial institution 206 may include either account data or a null response.

Financial institutions that do not have account data associated with the transmitted phone number may transmit null responses. In some embodiments, null responses may not be transmitted to smartwatch B. Rather, only responses with account data may be transmitted to the phone to bank resolver module.

Step 4 of the exemplary communication is shown at 214. The response, including the account data, may be received at the phone to bank resolver module. The phone to bank resolver module may link the received account data to the mobile phone number associated with smartwatch A.

Figure 3:
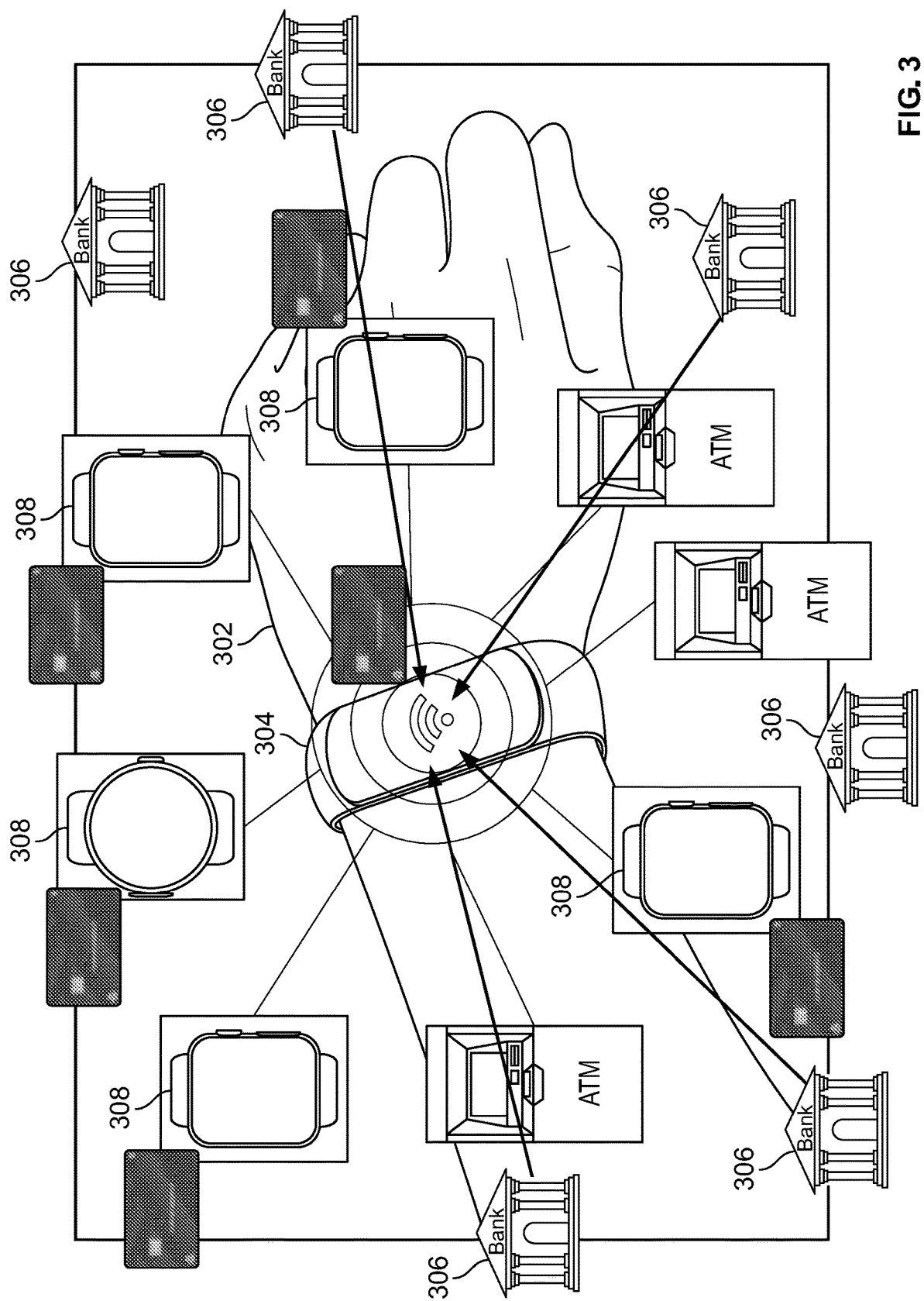
FIG. 3 shows another illustrative diagram in accordance with principles of the disclosure.

FIG. 3 shows another illustrative diagram. The illustrative diagram shows a smartwatch worn on a hand. Hand 302 may interact with authenticating smartwatch 304. The smartwatch includes a light mesh display.

The smartwatch light mesh may display data relating to each smartwatch 308 or ATM located within a threshold distance from the smartwatch light mesh. As shown in FIG. 3, the smartwatch may display a light mesh with nodes representing each smartwatch 308 or ATM located within a threshold distance from the smartwatch light mesh. Financial institutions' 306 information from each smartwatch is transmitted to authenticating smartwatch 304.

The wearer of the smartwatch, other smartwatches, other people, and other devices within the vicinity may interact with the light mesh display.

The light mesh display also receives information from financial institutions associated with the smartwatches and ATMs located within a threshold distance from the smartwatch light mesh.

Figure 4:
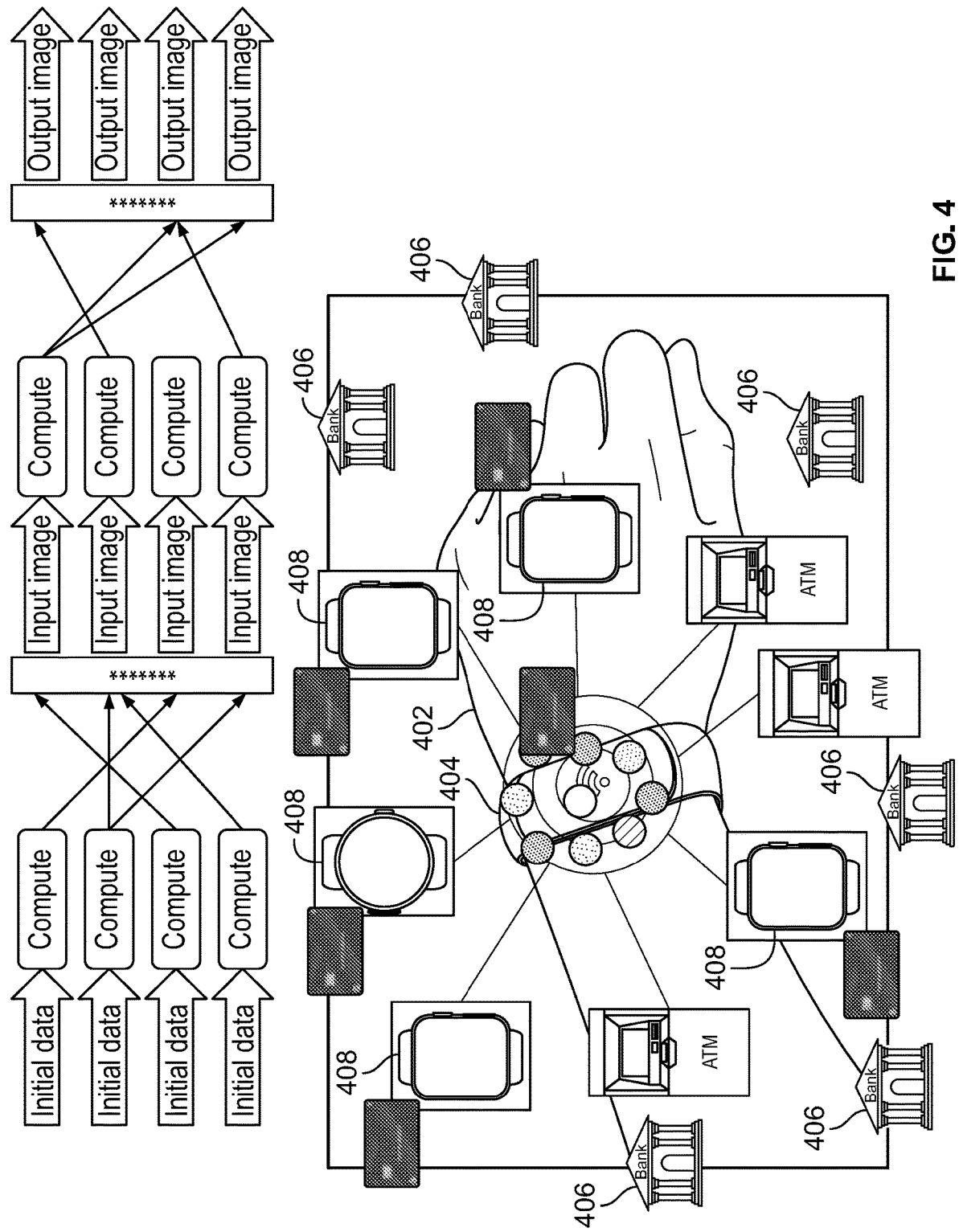
FIG. 4 shows another illustrative flow diagram in accordance with principles of the disclosure.

FIG. 4 shows an illustrative flow diagram. The authenticating smartwatch 404, worn on hand 402, receives initial data from the smartwatches 408 and ATMs located within a threshold distance. The smartwatch then computes whether it detects any potential fraud or threats from the smartwatches and ATMs located within a threshold distance.

Authenticating smartwatch 404 communicates with financial institutions 406 linked to smartwatches 408 and ATMs located within a threshold distance. Authenticating smartwatch 404 communicates with its own financial institution inputting images of the fraud detection results, corresponding to each smartwatch 408 and ATM. This information is computed by the smartwatch's own financial institution and relayed back to the authenticating smartwatch.

The authenticating smartwatch 404 receives the information about transaction authentication and creates output images representing valid, invalid, or pending transactions. The output images are displayed on the light mesh over the authenticating smartwatch.

Figure 5:
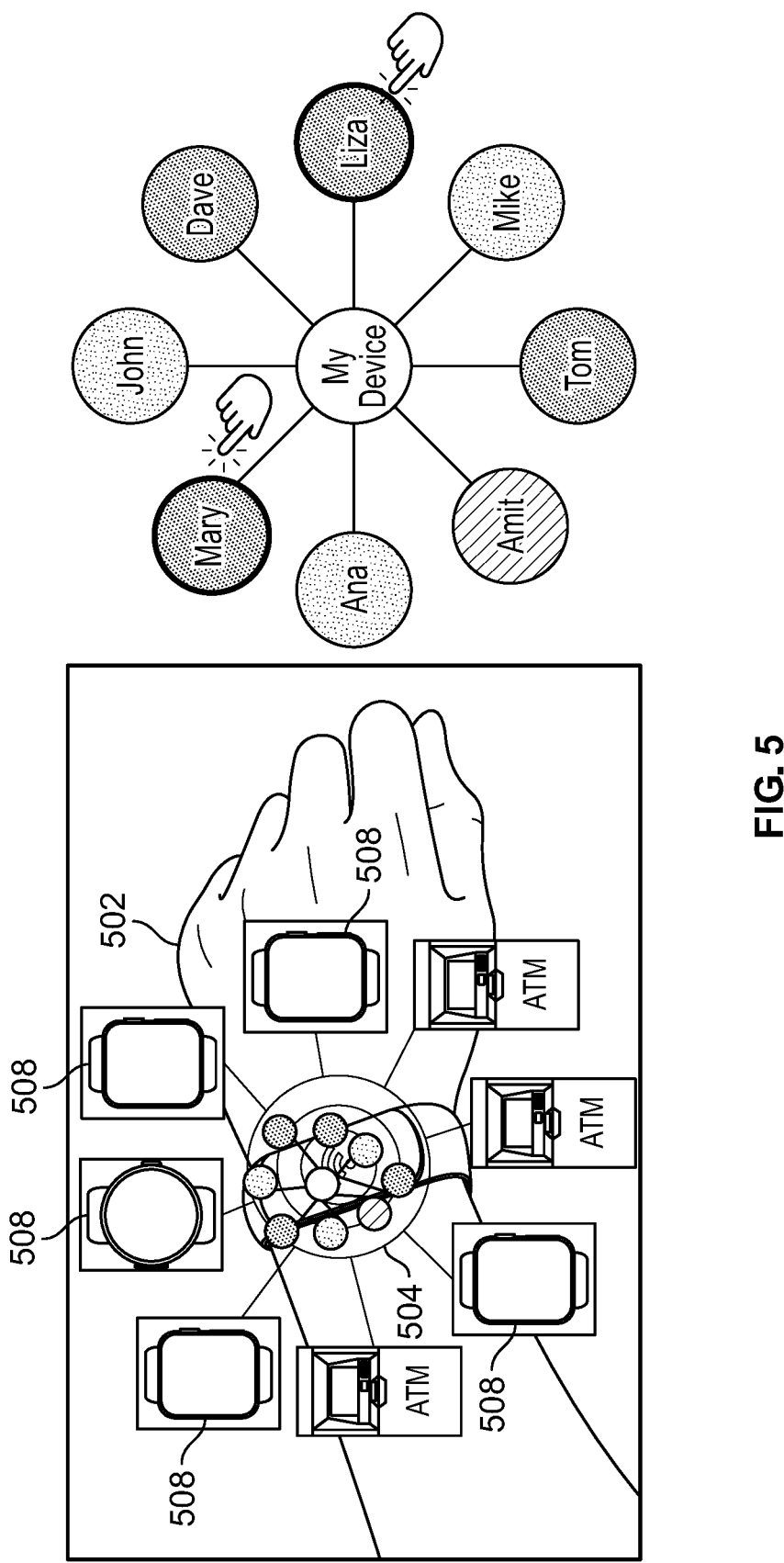
FIG. 5 shows yet another illustrative diagram in accordance with principles of the disclosure.

FIG. 5 shows an illustrative diagram. The smartwatch 504, worn on hand 502, forms a light mesh over the display with multiple multi-colored nodes. Each node represents a different ATM or smartwatch 508 located within a threshold distance.

In FIG. 5, "John" and "Mike" represent one color, "Dave" and "Tom" represent another color, "Liza" and "Mary" represent another color, and "Amit" represents another color. One color may represent valid transactions, one color may represent invalid transactions, and another color may represent pending transactions.

Figure 6:
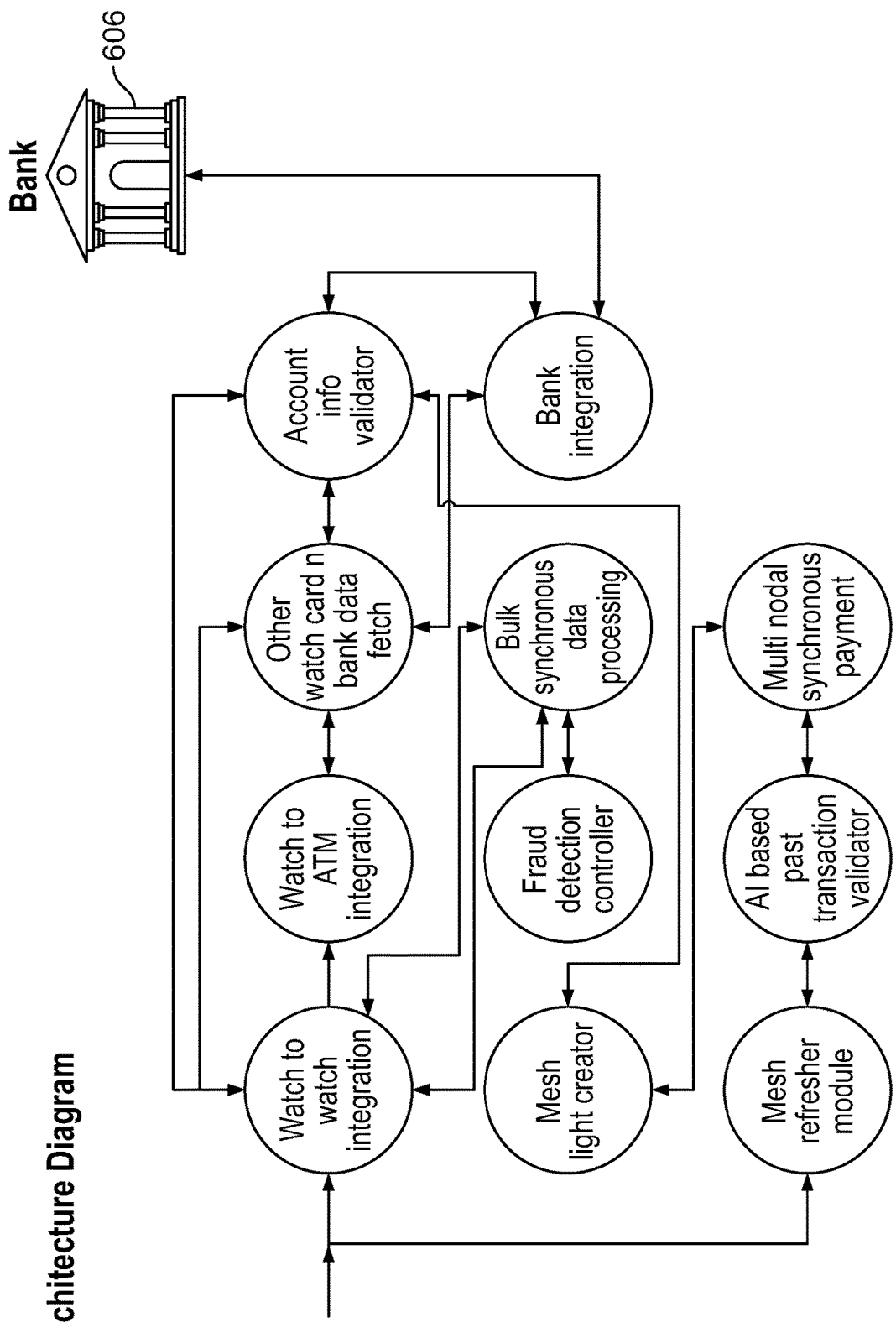
FIG. 6 shows yet another illustrative flow diagram in accordance with principles of the disclosure.

FIG. 6 shows an illustrative flow diagram. An authenticating smartwatch may initiate a scan of its surroundings to determine whether it can transact with smartwatches or ATMs located within a threshold distance.

Following the authenticating smartwatch's scan of its surroundings, smartwatches located within a threshold distance will begin watch-to-watch integration. The smartwatches will integrate with each other and the authenticating smartwatch by sharing account information and financial institution 606 information.

Further, ATMs located within a threshold distance also integrate with the authenticating smartwatch.

Once integration is complete, other smartwatches' card and financial institution 606 information is fetched for analysis.

Other smartwatches' card and financial institution 606 information is fed into an account information validator. The account information validator ensures that all account information is correct and accurate by checking with each card and financial institution 606.

At this point, financial institution 606 integration occurs. The financial institution 606 sends information to each card.

Data is collected from each card located within a threshold distance and is processed by bulk synchronous data processing. Bulk data is sent and received from the smartwatch.

A fraud detection controller receives the information from the bulk synchronous data processing. The fraud detection controller analyzes whether each card has either prior or current fraud.

The results from the fraud detection controller are sent back to the bulk synchronous data processing. This information is sent back to the smartwatch processor and converted into an image to be displayed.

The mesh light creator creates a light mesh. The light mesh could be displayed on a screen or a 3-dimensional hologram.

The light mesh is interactive and can lead to multi-nodal synchronous payment. The multi-nodal synchronous payment would enable payments to any verified and validated cards within a threshold distance.

The information is also vetted by an artificial intelligence ("AI") past transaction validator. The past 10 transactions from each card are reviewed and an AI tool confirms that the past 10 transactions match up and are in the correct chronological sequence.

A mesh refresher module will refresh the light mesh with new information after information is processed or after the smartwatch user interacts with the light mesh.

In certain embodiments, prior to communicating with the associated device, each financial institution may execute an account verification. As such, if the account verification fails, the financial institution may communicate the failure to the smartwatch. In such embodiments, the financial institution may not communicate with the device associated with the card.

Thus, an interactive light mesh over smartwatch enabling transactions with smartwatches and ATMs located within a threshold distance is provided. Persons skilled in the art will appreciate that the present invention can be practiced by other than the described embodiments, which are presented for purposes of illustration rather than of limitation. The present invention is limited only by the claims that follow.

What is claimed is:

1. An interactive light mesh over a smartwatch used for authentication of smartwatch-based transactions comprising multi-colored nodes, said interactive light mesh comprising:
    a plurality of hardware components, the plurality of hardware components comprising a mesh light creator, and the mesh light creator being operable to create an interactive mesh of lights displayed over a display of the smartwatch, each of the interactive mesh of lights corresponding to a single node of the multi-colored nodes, and the mesh light creator being further operable to create a three-dimensional hologram;
    wherein the multi-colored nodes represent smartwatches and ATMs located within a threshold distance of the smartwatch;
    wherein the interactive light mesh displays transaction approval requests, transaction approvals, and transaction denials;
    wherein at least one node color represents valid transactions, and at least one node color represents invalid transactions;
    wherein the smartwatch comprises a multi-layered screen, said multi-layered screen comprising an input screen, an output screen, a touch panel, and a display screen; and
    wherein the display portion of the multi-layered screen is used to create the three-dimensional hologram for depicting that the information on the display of the smartwatch in the same location as the user of the smartwatch.

2. The interactive light mesh of claim 1, wherein at least one node color of the light mesh represents pending transactions.

3. The interactive light mesh of claim 1, wherein the threshold distance is about 6 feet.

4. The interactive light mesh of claim 1, wherein the threshold distance is about 8 feet.

5. The interactive light mesh of claim 1, wherein the threshold distance is about 10 feet.

6. The interactive light mesh of claim 1, wherein the threshold distance is about 20 feet.

7. The interactive light mesh of claim 1, wherein the smartwatch comprises a touch screen.

* * * * *